(12) United States Patent
Alve et al.

(10) Patent No.: US 7,487,363 B2
(45) Date of Patent: Feb. 3, 2009

(54) SYSTEM AND METHOD FOR CONTROLLED COPYING AND MOVING OF CONTENT BETWEEN DEVICES AND DOMAINS BASED ON CONDITIONAL ENCRYPTION OF CONTENT KEY DEPENDING ON USAGE

(75) Inventors: Jukka Alve, Helsinki (FI); Peter K. Chiu, Nashua, NH (US); Zheng Yan, Espoo (FI); Juha Hietasarka, Karsikas (FI)

(73) Assignee: Nokia Corporation, Espoo (FI)

( * ) Notice: Subject to any disclaimer, the term of this patent is extended or adjusted under 35 U.S.C. 154(b) by 917 days.

(21) Appl. No.: 09/982,573

(22) Filed: Oct. 18, 2001

(65) Prior Publication Data

US 2003/0076955 A1    Apr. 24, 2003

(51) Int. Cl.
H04L 9/00     (2006.01)
H04L 9/32     (2006.01)

(52) U.S. Cl. .................. 713/193; 713/150; 713/165
(58) Field of Classification Search .............. 713/156, 713/176, 193, 189, 150, 165; 380/281, 282; 726/7

See application file for complete search history.

(56) References Cited

U.S. PATENT DOCUMENTS

| | | |
|---|---|---|
| 4,888,801 A | 12/1989 | Foster et al. |
| 5,142,578 A | 8/1992 | Matyas et al. |
| 5,265,164 A | 11/1993 | Matyas et al. |
| 5,715,403 A | 2/1998 | Stefik |
| 5,729,608 A | 3/1998 | Janson et al. |
| 5,748,738 A | 5/1998 | Bisbee et al. |
| 5,812,666 A | 9/1998 | Baker et al. |
| 5,862,325 A | 1/1999 | Reed et al. |
| 6,112,181 A | 8/2000 | Shear et al. |
| 6,185,683 B1 | 2/2001 | Ginter et al. |
| 6,253,193 B1 | 6/2001 | Ginter et al. |
| 6,263,435 B1 | 7/2001 | Dondeti et al. |
| 6,266,299 B1 | 7/2001 | Oshima et al. |
| 6,389,403 B1 | 5/2002 | Dorak, Jr. |
| 7,065,216 B1 | 6/2006 | Benaloh et al. |

(Continued)

FOREIGN PATENT DOCUMENTS

WO    WO0067415    11/2000

OTHER PUBLICATIONS

Performance analysis of the confidentiality security service in the IEEE 802.11 using WEP, AES-CCM, and ECC Leon, M.; Aldeco, R.; Merino, S.; Electrical and Electronics Engineering, 2005 2nd International Conference on Sep. 7-9, 2005 pp. 52-55.*

(Continued)

*Primary Examiner*—David Jung
(74) *Attorney, Agent, or Firm*—Morgan & Finnegan, L.L.P.

(57) ABSTRACT

A system and method is disclosed for allowing content providers to protect against widespread copying of their content, while enabling them to give their customers more freedom in the way they use the content. In accordance with one embodiment, content providers identify their content as protected by watermarking the content. Consumers use compliant devices to access protected content. All of a user's compliant devices, or all of a family's devices, can be organized into an authorized domain. This authorized domain is used by content providers to create a logical boundary in which they can allow users increased freedom to use their content.

15 Claims, 8 Drawing Sheets

U.S. PATENT DOCUMENTS

| | | |
|---|---|---|
| 2001/0020228 A1 | 9/2001 | Cantu et al. |
| 2002/0099948 A1 | 7/2002 | Kocher et al. |
| 2002/0152393 A1 | 10/2002 | Thoma et al. |
| 2002/0157002 A1 | 10/2002 | Messerges et al. |
| 2003/0079120 A1 | 4/2003 | Hearn et al. |
| 2004/0168077 A1 | 8/2004 | Waxman et al. |

OTHER PUBLICATIONS

On the (non)universality of the one-time pad Dodis, Y.; Spencer, J.; Foundations of Computer Science, 2002. Proceedings. The 43rd Annual IEEE Symposium on Nov. 16-19, 2002 pp. 376-385.*

Interfacing a high speed crypto accelerator to an embedded CPU Hodjat, A.; Verbauwhede, I.; Signals, Systems and Computers, 2004. Conference Record of the Thirty-Eighth Asilomar Conference on vol. 1, Nov. 7-10, 2004 pp. 488-492 vol. 1.* http://www.w3.org/2000/12/drm-ws/pp/versaware-hahn.html.* http://www.w3.org/2000/12/drm-ws/pp/hp-poorvi2.html.*

An efficient application of a dynamic crypto system in mobile wireless security Soliman, H.S.; Omari, M.; Wireless Communications and Networking Conference, 2004. WCNC. 2004 IEEE vol. 2, Mar. 21-25, 2004 pp. 837-842 vol. 2.*

Digital right management and watermarking of multimedia content for m-commerce applications Hartung, F.;Ramme, F.; Communications Magazine, IEEE vol. 38, Issue 11, Nov. 2000 pp. 78-84.*

Secure and Flexible Digital Rights Management in a Pervasive Usage Mode Zhaofeng, Ma; Yixian, Yang; Xinxin, Niu; Computational Intelligence and Security, 2007 International Conference on Dec. 15-19, 2007 pp. 863-867.*

Menezes, A. et al. "Ch. 13 Management Techniques", CRC Press, Inc., 1997, XP-02423026, pp. 548-572.

Bloom, Jeffrey A., et al., "Copy Protection for DVD Video", Proceedings of the IEEE., vol. 87, No. 7, Jul. 1999, pp. 1267-1276.

Supplementary Partial European Search Report of EP Application No. 02801461.1. year 2008.

* cited by examiner

SYSTEM AND METHOD FOR CONTROLLED COPYING AND MOVING OF CONTENT BETWEEN DEVICES AND DOMAINS BASED ON CONDITIONAL ENCRYPTION OF CONTENT KEY DEPENDING ON USAGE

BACKGROUND OF THE INVENTION

In recent years the amount of information available in digital form has grown significantly. Digital data, which is easily reproduced and distributed, but retains superior quality, has been extremely beneficial to information and media content providers. The advantages for content providers, however, are not absolute. The same factors that make digital data attractive as a distribution format, i.e. high quality, easy reproduction and easy distribution, apply equally to pirates who make and distribute unlicensed copies of the data. Furthermore, with access to distribution mediums like the Internet millions of unlicensed, pirated, copies can be created effortlessly. This type of unlicensed copying is already widespread in the music industry with users of peer-to-peer file sharing services, like Gnutella, and costs the music industry millions in potential revenues.

Copy protection techniques exist in the prior art to address these issues. For example, the content can be tied to the user's device by encrypting the content with a key unique to the device. This approach, however, severely limits what valid licensed users can do with their content. Consumers expect to be able to have some freedom in the way they use their content. They expect to be able to transfer the content to other devices they use; and, they expect to be able to make back-up copies to protect their content in the event of a hardware failure. Purchasers of music, for example, expect to be able to listen to the music they purchase at home, on their car stereo, and on portable audio devices. Accordingly, overly restrictive systems that prevent these types of uses are unlikely to be accepted in the marketplace.

SUMMARY OF THE INVENTION

The above identified problems are solved and a technical advance is achieved in the art by providing a system and method for the controlled copying and moving of content between devices and domains.

An exemplary method includes receiving content at a user's device. The received content is encrypted with a content key. The content key is protected by encrypting it with a domain key. A user's compliant devices, or a family's compliant devices, can be organized into an authorized domain. All the devices in an authorized domain would have the ability to decrypt the encrypted content key. A user can freely send the encrypted content and the encrypted content key to other devices in the domain. At the receiving device, the content key is decrypted to its clear form. The clear content key is then available to decrypt the content. This assures content providers that their content will not be subject to widespread piracy because only devices within the user's domain can decrypt content keys encrypted with the domain key.

Another aspect of the present invention would ensure backwards compatibility by letting content providers distinguish protected content from unprotected or legacy content. This would be accomplished by applying a digital watermark to the protected content through the use of any of a number of known techniques, such as those provide by the Digimarc corporation. Watermarks are embedded into the content and can be made to be perceptible or imperceptible to users. Authorized devices can remove perceptible watermarks to ensure the content is unobstructed when rendered. Digital watermarks have the advantage of being robust meaning that once embedded it is difficult to remove them from the content even if the content is translated to other formats, e.g. if the content is printed or translated into an analog format.

Where watermarks are employed, a device receiving the content would check for the watermark. Content that is watermarked is treated as protected content and undergoes the protection mechanisms described herein. Content that is not watermarked is treated as unprotected content. As such, no encryption is applied to the content and transfer of the content to other domains would be successful.

Another embodiment of the present invention allows content providers to include information with the content dictating the ways consumers may use the content within their domain. For example, a digital video broadcast (DVB) could include usage state information in a program's service information (SI) table. The usage state information is read by the compliant device and tells it how the consumer can use the content. For example, the usage state might let the consumer move the program from one device to another but not copy the program. Or, the usage state information could dictate no copying or moving is allowed.

Where usage states are employed, devices receiving content check for a usage state. If any usage restriction is applied, i.e. the usage state does not indicate usage as unrestricted, the content key is encrypted with a device key. Encryption with the device key ensures that only the receiving device can decrypt the content key. Accordingly, the receiving device has the ability to check that the usage restraints are satisfied before the content is used.

In a further embodiment watermarks and usage states can be applied in combination to provide additional security. In this embodiment a content ID can be incorporated into the watermark. The same content ID is also associated with the usage state, thereby uniquely linking the watermarked content to the specific usage state. This approach has the advantage of ensuring that the system cannot be circumvented by attempts to associate different, less restrictive, usage states with the watermarked content.

In another embodiment of the invention broader freedom for the users is allowed by regulating how content is used outside the authorized domain. A domain traversal flag is included with the content in the same way disclosed for the usage state. The domain traversal flag indicates whether out of domain transfer of the content is allowed. A combination of the usage state and the domain traversal flag is used to precisely dictate what can be done with the content inside and outside the domain.

Another embodiment of the present invention provides a method that allows the content provider, or content protection service provider, to know which content key will be used to encrypt the content without broadcasting the key itself. The content provider transmits a content key seed with the content. The content key is then generated at the receiving device by operating on the content key seed with the device's domain key, which the content provider has a copy of. The content provider can recreate the content key, if it needs to, by using its copy of the same domain key to operate on the content key seed in the same way.

A multitude of interactions and business relationships are made possible by the present invention. When the present invention is used for complex transactions between users, content providers, content creators, etc., a trust management provider may be employed. The trust management provider is a further aspect of the present invention that can align different trust infrastructures used in different authorized devices, facilitate the transfer of content between users of different content providers, or act as an intermediary to support novel business models. It accomplishes this by providing a neutral trusted third party that can enforce the requirements of the content protection system.

Other and further aspects of the invention will become apparent during the course of the following description and by reference to the attached drawings.

DETAILED DESCRIPTION OF THE INVENTION

The content protection system of the present invention provides a flexible means for allowing content providers to dictate allowable uses of licensed content. It is built around a logical framework of authorized devices and authorized domains. Authorized devices are simply devices that contain the software and/or hardware necessary to comply with the disclosed system. Authorized domains are groups of authorized devices owned by a user. The inclusion of authorized domains in the content protection system of the present invention provides content distributors with a reasonable boundary to limit users' freedom to use their content.

Figure 1:
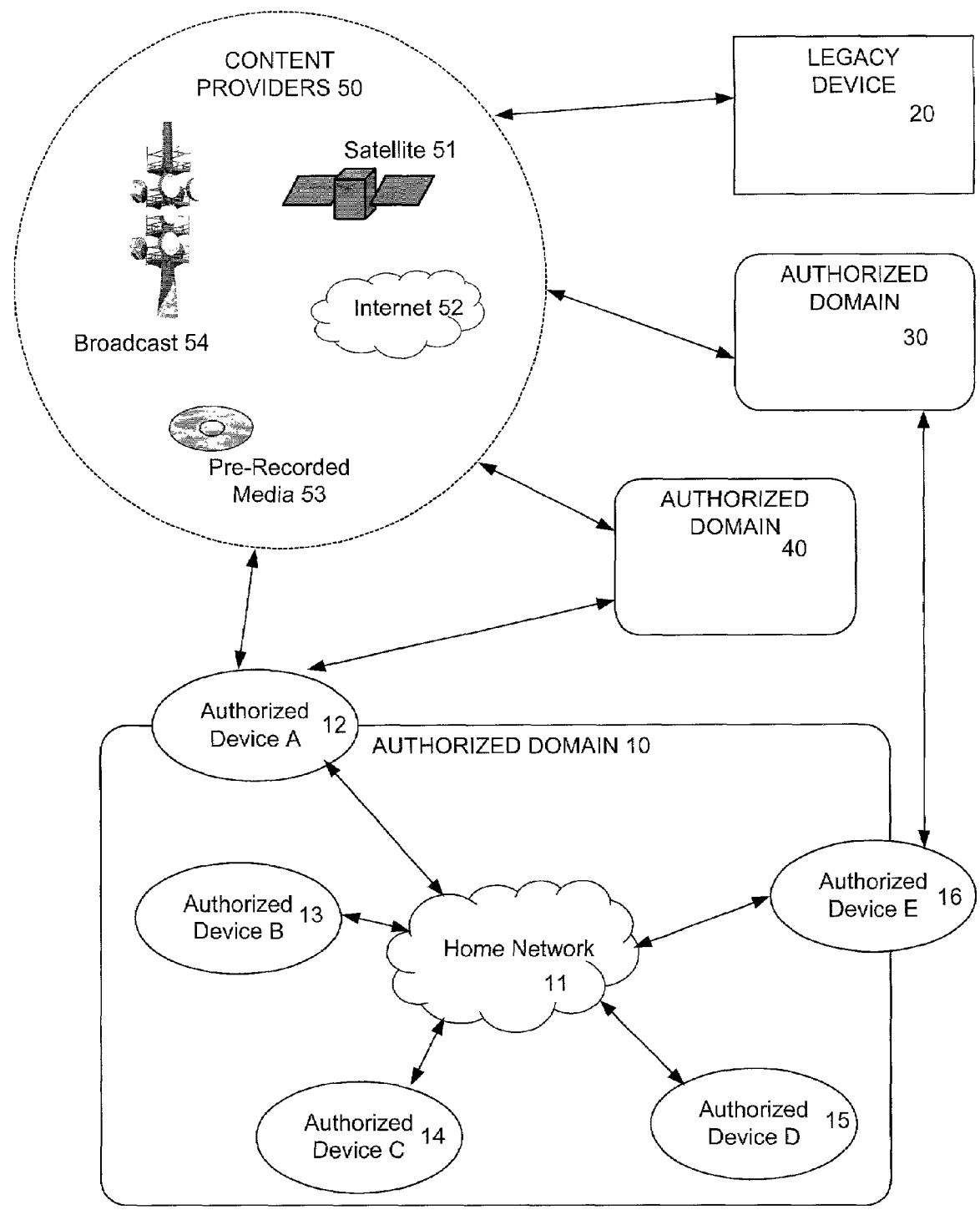
FIG. 1 is a block diagram illustrating an exemplary embodiment of the present invention.

FIG. 1 is a block diagram illustrating an exemplary embodiment of the present invention. In accordance with the present invention content providers 50 distribute content to consumers who receive the content on compliant authorized devices, like authorized device A 12, or on non-compliant legacy devices, like legacy device 20. The content providers can distribute their content in any number of ways such as via satellite transmission 51, the Internet 52 (via streaming or download), pre-recorded media 53 (like CD-ROMs), traditional broadcast 54, or the like.

Any device used to play or record content could be an authorized device. The only factor that distinguishes authorized devices from other devices is that authorized devices are designed or programmed to comply with the content protection system of the present invention. The devices would generally contain a CPU, RAM, long term memory, and a method for communicating with other devices. Examples of possible authorized devices include digital video recorders (DVR), TV receivers, DVD players/recorders, personal computers, personal digital assistants, stereo receivers, CD players/recorders, minidisc players/recorders, DAT players/recorders, digital video cameras, etc.

A content recipient participating in the content protection system would have one or more authorized devices organized into an authorized domain. The authorized domain represents some logical grouping of devices. The authorized domain might include all of an individual's devices, a household's devices, or a company's devices. The authorized domain could be any grouping of devices that would be convenient to the user, or it may be dictated by the party that manages the content protection system. Where the content protection system manager dictates what grouping of devices may be placed in an authorized domain, it may do so by limiting the total number of devices included in a domain. Or, it may dictate the relationship between the owners of the devices in a domain, e.g. they must all live at the same address.

Still referring to FIG. 1, authorized domain 10 shows one possible arrangement of an authorized domain. Authorized domain 10 comprises five authorized devices, authorized device A 12, authorized device B 13, authorized device C 14, authorized device D 15 and authorized device E 16. All of these devices are connected together via home network 11. In an advantageous embodiment, home network 11 would be a LAN connecting the various authorized devices using any know networking protocol and hardware interface, e.g. TCP/IP over a wired or wireless Ethernet network. A full-fledged home network, however, is not required. The basic requirement is only that an authorized device in the authorized domain has a way to transfer files between itself and another authorized device. This mechanism for transferring files could be anything from a Universal Serial Bus (USB) connection to a simple floppy disk.

Authorized device A 12 and authorized device E 16 are border devices because they can receive content from outside the authorized domain 10. And, if the domain traversal flag allows, they can transfer files out of the domain.

For example, authorized device A 12 might be a DVR that can receive DVB television content from satellite 51. The DVR might also have Internet connectivity that gives it the ability to send recorded programs to other devices over the Internet. In such a scenario the user of authorized domain 10 could use authorized device A 12 to send a program he liked to his friend's digital TV receiver in authorized domain 40. Of course this would only work if the usage state and domain traversal flag set by the DVB broadcaster allowed this use.

The operation of the system is further demonstrated by showing how a person going on a trip might use the system. In this example, authorized device E 16 is a portable MP3 player and authorized device D 15 is a home stereo with a hard drive to store the user's MP3s. A user of the authorized domain 10 could, if allowed by the content provider, copy MP3 files from the stereo to the portable MP3 player using a short range wireless system like Bluetooth. She could then enjoy the music on the portable player while flying to her destination. Upon arrival, if moves outside the authorized domain are allowed, she could move the music stored on the player to her rental car's stereo in authorized domain 30 for enjoyment while driving.

Backward Compatibility

Backward compatibility is an important aspect in gaining acceptance for any new content protection scheme. Backward compatibility is important because of the countless number of non-compliant devices that are currently being used and the amount of time required to get a significant number of compliant devices into public use. Accordingly, few content providers will want to adopt a new system if it means they will have to limit their audience to the few compliant devices that have been sold.

The present system could be implemented in a way that is not backward compatible. For example, content providers could distribute their content in encrypted form. Authorized border devices would have the required keys to decrypt the received content. Depending on the distribution method used, these keys could be generated every time content is transferred, which would be an advantageous method for Internet downloads; or, they could be stored in the authorized device and refreshed from time to time in a secure way, which would be the most useful method for DVB. This option might even be preferable to some content providers who are willing to forego backward compatibility for tighter control of their content.

The invention can also be implemented in a manner that provides backward compatibility through the use of watermarking. This would allow the content provider to distribute information that both retains the prescribed use limitations in compliant systems and is usable in non-compliant legacy systems.

Watermarking is a system where information can be embedded into content without obscuring the content. The watermark applied to a piece of content can be as perceptible or imperceptible as the content provider wishes. Watermarking can accomplish this while remaining robust, i.e. the watermark cannot be removed from the content because it is part of the content.

The robust nature of watermarking makes it ideal for creating a backward compatible content protection system. Watermarks can be used to positively identify content that is protected under the content protection system of the present invention thereby distinguishing it from legacy or unprotected content. Without a robust way of identifying protected content, pirates could strip the protection information from the content and thereby confuse authorized devices into treating protected content as unprotected or legacy content. In a system that didn't use watermarking, this could be accomplished by simply removing the usage state information and domain traversal flag from the content. With a watermark to identify protected content, an authorized device would still recognize the content as protected even if the information identifying the level of protection has been removed. In such a case the authorized device can then assume the content has been tampered with and apply the strictest available protection.

As noted above, the watermarked content is not completely obscured and remains usable on legacy devices. An example of a crude form of visual watermarking would be to place a large opaque mark directly over the content. Presumably, authorized devices would be able to remove this mark, through the use of watermark key, when rendering the content. Such a mark would severely limit the value of the content for legacy devices. The content provider can choose the level of obstruction it desires by using smaller and/or translucent marks. In deciding on an appropriate level of obstruction, the content provider can balance its desire to protect its content against its need to serve legacy devices. This balance might take into account its desire to push consumers to upgrade to compliant devices, or the nature of the content being distributed.

In situations where parity between the content quality for compliant and legacy devices is required, steganography can be used to completely hide the watermark. Such a technique might be used for network television where there is a large audience with legacy devices who are unlikely to upgrade to the latest equipment.

In an advantageous embodiment of the present invention, the watermark will contain a content ID uniquely identifying the content. This content ID can then be used with usage information associated with the content. In this way usage restrictions are securely tied to the content to which they apply. The content ID prevents users from avoiding the protection scheme by substituting different usage information to be used with the content. Such an attempt will fail because the substituted usage information will not have the correct content ID associated with it. The content ID can be securely tied to the usage restriction through the use of hashing functions, digital signatures and/or any other known technique.

The addition of a content ID in the watermark and associating that same content ID with the usage information has the further advantage of ensuring that the usage information broadcast by the content providers remains diverse. Without this unique identifier for the usage information, hashing functions applied to usage information associated with different content would return similar values. A party trying to circumvent the system could then learn the appropriate hash values for different usage rights and defeat this protection.

Operation of the System

The basic operation of the system of the present invention relies on cryptographic techniques to protect content on an authorized device. Protection begins by encrypting the content and creating a voucher associated with the content. The voucher holds the key to decrypt the content, the usage state information and the domain traversal flag. The usage state and the domain traversal flag dictate how the content may be used. Usage states can range from unrestricted, meaning any copy, move or use is allowed, to completely restricted, which would prevent copying, moving or using the content. The content encryption key stored in the voucher is protected so that pirates cannot misappropriate it and use it to create unlicensed versions of the content. Content key protection is accomplished by encrypting the key itself or the whole voucher. In an advantageous embodiment, only the content key is encrypted. The other elements of the voucher are protected from tampering, but remain readable. This can be accomplished, for example, by using a cryptographic hashing function and then signing the hash by encrypting it with the device's private key. Keeping portions of the voucher readable when the content is inaccessible has the advantage of providing users with information regarding why their attempt to use failed. In a superdistribution model the readable information could tell the user how to obtain a right to use the content. Additional encryption can be added to ensure higher levels of security.

Figure 2A:
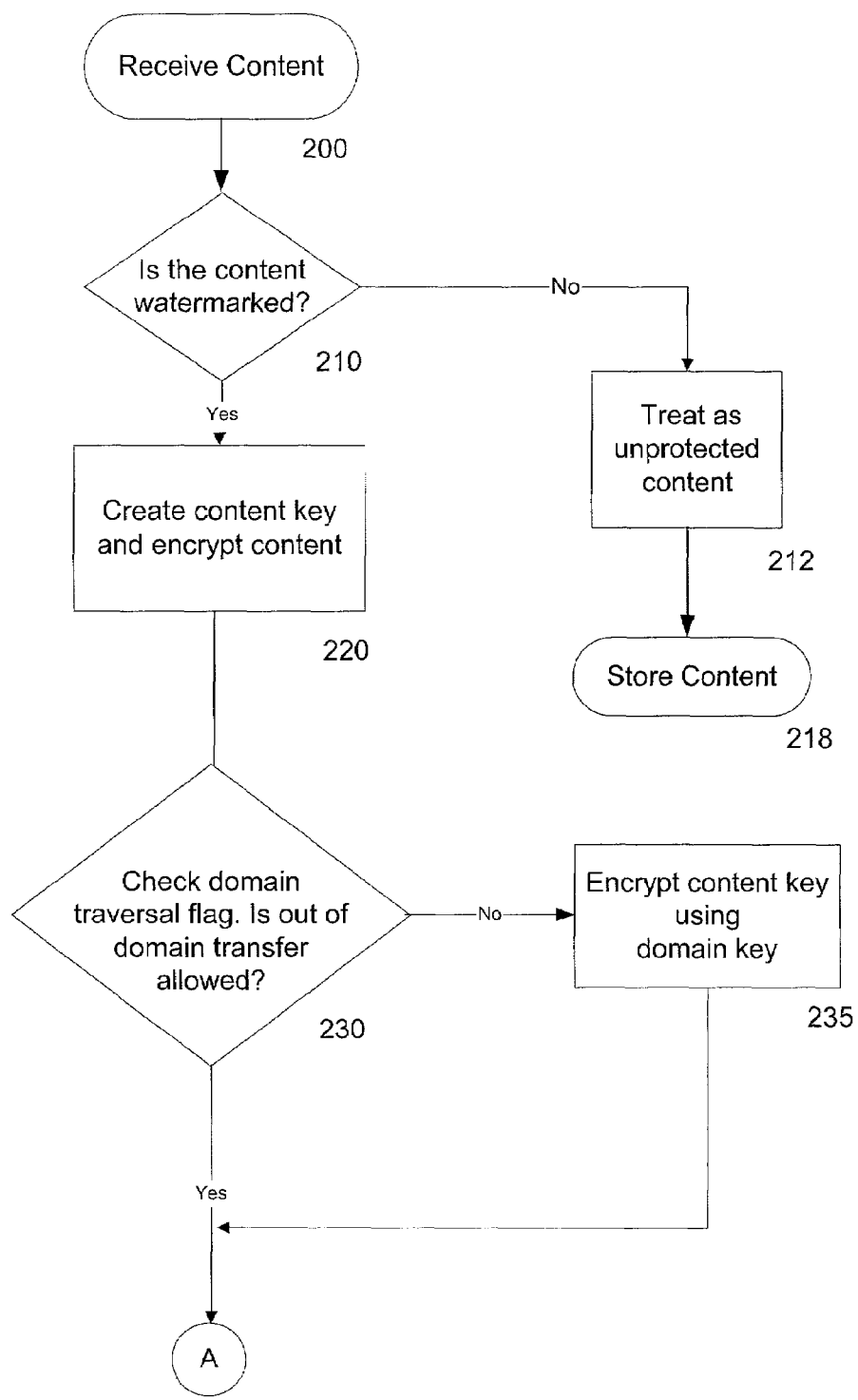
FIGS. 2a and 2b are an exemplary flow chart by which an authorized border device receives content in the embodiment of FIG. 1.
Figure 2B:
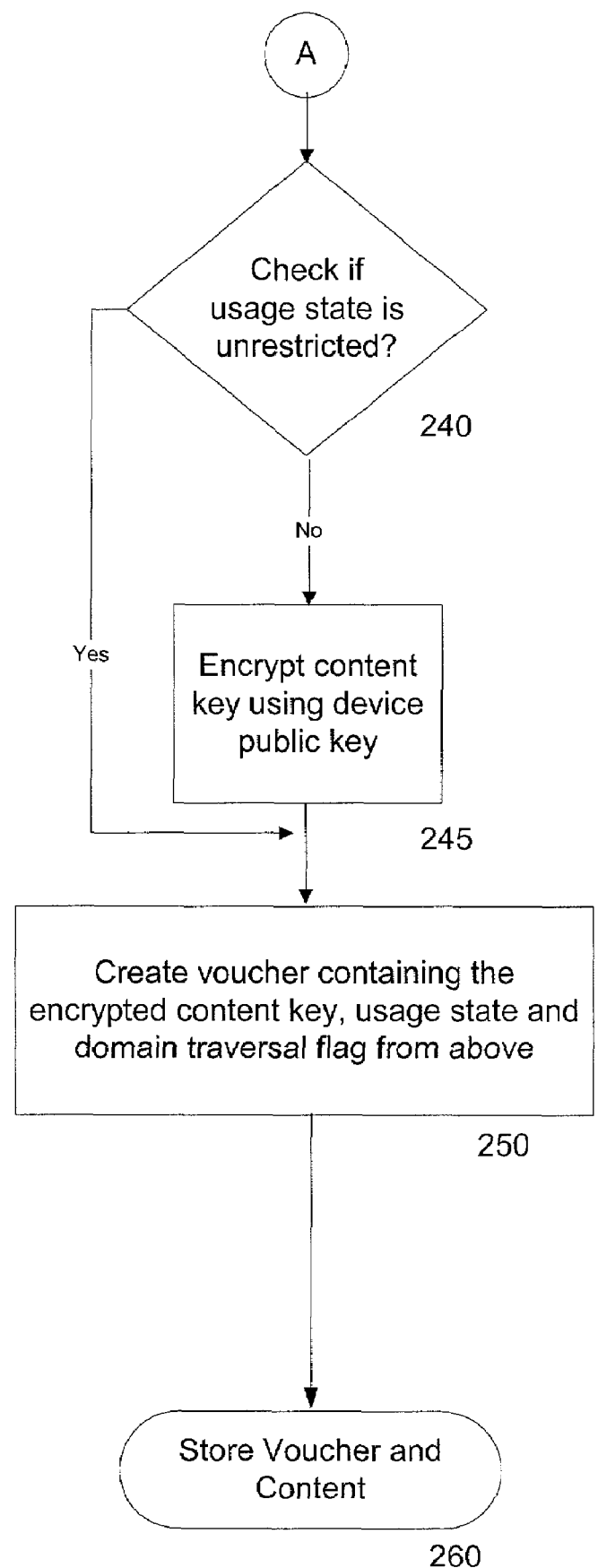

FIGS. 2a and 2b show an exemplary method by which an authorized border device receives content in the embodiment of FIG. 1. In block 200, the device receives content. In block 210, the device checks for a watermark that would identify the content as protected.

If there is no watermark, the device treats the content as unprotected or legacy content in block 212. This might include the creation of a voucher dictating that the usage state and domain traversal are completely unrestricted, but creation of a voucher is not strictly necessary. Using a voucher for unprotected content would allow designers to remove watermark detection procedures from non-border devices. Rather than checking for watermarks, non-border devices could simply refuse any non-vouchered content.

If the content is watermarked, block 220 is executed and a content key is created and the content is encrypted with it. This step of encryption can be accomplished by any known techniques, such as RC-5, IDEA, Blowfish, Cast-n, Misty, Skipjack, AES, 3-DES. To ensure efficient operation it will most likely be accomplished using a symmetric cryptographic algorithm, like AES. If the watermark is perceptible this step might also include removing the perceptible portion of the watermark. Alternatively, the watermark could be removed when the content is rendered.

The creation of the content key can be accomplished by randomly generating the key or by using a content key seed transmitted with the content. Sending a content key seed with the content allows the content provider to know the content key that will be used to encrypt the content without broadcasting the content key itself. The content provider accomplishes this by sending along with the content key seed a content ID. The content key seed and the content ID are associated with one another in a way known only by the content provider. Upon receipt of the content key seed an authorized device generates a content key by encrypting the content key seed with its domain key. After the content key is created the content key seed is discarded and no longer used by the receiving device. When the device creates a voucher associated with the content it includes in the voucher the content ID and a domain ID identifying its domain. If the content provider ever needs the content key, it can use the content ID and domain ID contained in the voucher to look up the content key seed and the domain key. It can then perform the same operation performed by the authorized device to recreate the content key.

Giving the content provider the ability to recreate the content key is useful for at least three reasons. If the content key associated with the content is ever lost or destroyed, the content provider can recreate the key and create a new voucher for the content. If the content is transferred to a device where it cannot be used, the content provider could issue a valid voucher for the content. This is one way to enable superdistribution. Distributing the content key seed rather than the content key itself has the advantage of avoiding the need to protect the content key in transit, and creates an easy way to ensure that different domains have different content keys.

Block 230 checks the domain traversal flag to determine if domain traversal is allowed. If domain traversal is not allowed, meaning the information cannot be sent out of the authorized domain, the content key is encrypted with a domain key in block 235. The domain key is a key shared by all the devices in an authorized domain. Having the same domain key is the thing that defines the devices as being part of a single domain.

Block 240 checks the usage state information associated with the content. In most instances the usage state information will be transmitted with the content and will have an associated content ID, which will match a content ID contained in the watermark. The usage state information can have a variety of different settings, some possible usage states are:

Unrestricted
Copy X times
Copy once
Copy no more
Copy never
Copy never, move never If the usage state is anything other than unrestricted, the content key is encrypted in block 245 using the public key of the receiving device. As is typical of public key cryptography systems, encryption with the public key of this device ensures that only the private key of this device can decrypt the content key. Since the content will be useless unless this device decrypts the content key, this step ensures that the device will control any of the content. If the use is unrestricted this step is unnecessary.

An alternative to distributing the usage state with the content is to make the information implicit. Under this system allowable uses of the content are added by the receiving device rather than transmitted with the content. This avoids the need to download usage state information with the content. This system, however, lacks the flexibility of the system described above because all content would have the same usage state information. This system could be made somewhat more flexible system by using a few different usage states that are applied based on some other criteria. For example, in the DVB context different usage states could be applied based on the channel the program was broadcast on. In this scenario regular networks might have liberal usage states, but pay-per-view channels might apply the strictest available usage state.

Block 250 creates a voucher containing the encrypted content key, the usage state, content ID and the domain traversal flag. For enhanced security the voucher can be protected to ensure that a pirate does not alter the usage state information. This could be accomplished through the use of a cryptographic hashing function and digital signature.

Finally, block 260 stores the voucher and encrypted content at the device.

A careful review of the process just described will show that the content key is encrypted based on the type of protection asserted. If, for example, copying is unrestricted but transmission outside the domain is not allowed only the domain key will be used to encrypt the content key. Encrypting the content key based on the protection asserted simplifies the re-targeting of content to other devices. For example, re-targeting content that is usage unrestricted and domain traversal forbidden would simply involve checking to see if the target device is within the domain and then sending the content and the voucher to the target device. No other operations are necessary. Even the step of checking whether the target device is in the domain could be omitted because an out of domain device would not have the requisite domain key so the encrypted content would be unusable.

The situation just described is especially advantageous, because usage unrestricted and domain traversal forbidden is likely to be the prime setting chosen by content providers. In fact, it may be the only setting content providers would need implemented. This level of protection strikes a balance between protecting content from widespread piracy and retaining a fairly unrestricted level of use for licensed customers.

Figure 3A:
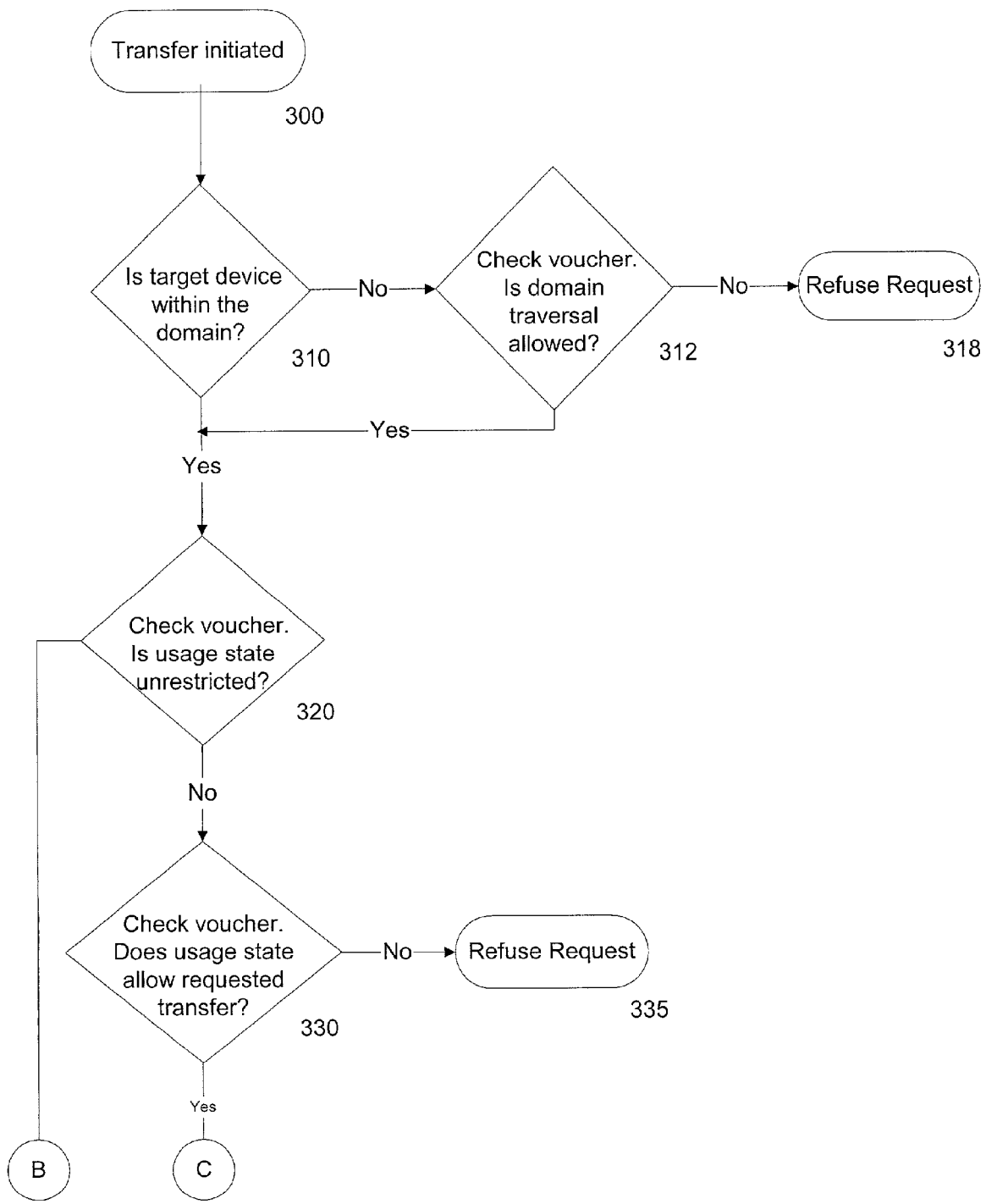
FIGS. 3a and 3b are an exemplary flow chart by which an authorized device transfers content to another authorized device in the embodiment of FIG. 1.
Figure 3B:
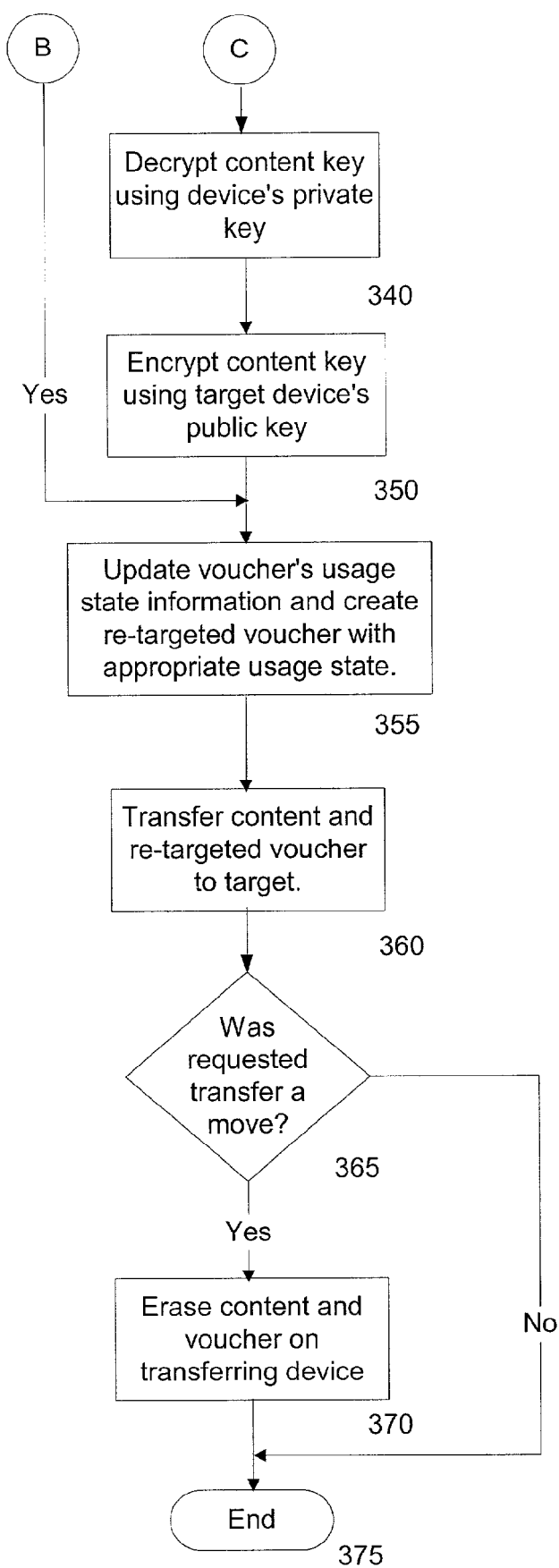

FIGS. 3*a* and 3*b* are an exemplary flow chart by which an authorized device moves or copies previously received content to another authorized device in the embodiment of FIG. 1. In block 300, the transfer is initiated.

In block 310, the transferring device checks if the target device is within the domain. If it is not, the domain traversal flag in the voucher is checked in block 312 to see if domain traversal is allowed. If it is not allowed, the request is refused in block 318. As one would imagine, blocks 310, 312 and 318 are not strictly required because even if an out of domain device receives the content it will not be able to use it without the domain traversal key. The only advantage of these steps is that they quickly avoid the rest of the procedure if domain traversal is forbidden.

In block 320, the voucher usage state is checked. If usage is unrestricted, the process proceeds immediately in block 360 to transfer the voucher and the content. If the usage state indicates that usage is in some way restricted, the usage state is checked in block 330 to see if the requested operation is allowed. If it is not allowed, the request is refused in block 335. If the requested operation is allowed, the content key must be re-targeted. In block 340, the content key is decrypted using the transferring device's private key. Then in block 350, the content key is encrypted using the target device's public key. This newly encrypted content key is used as part of a re-targeted voucher to be sent to the new device.

In block 355, any necessary changes in the usage state information are made. For example, if the usage state was copy X times, where X is a positive integer, X is reduced by 1. If X was 1, the usage state becomes copy no more. Copy no more and copy never are essentially the same, except copy no more might be used to indicate that the content provider be contacted to purchase additional usage privileges. The copy once state listed above is identical to copy X where X equals 1.

Block 355 is also the first place where the difference between copy and move becomes relevant. Copy indicates the creation of a duplicate of the file where the transferring and the target device retain a copy of the file. Conversely, move indicates that the transferring device does not retain a copy of the file. Always allowing moves would be a way protected digital content could be made to comply with the first sale doctrine of copyright law.

With respect to step 355, if a move was requested, nothing would be done unless of course another usage control was implemented that restricted the number of moves (implementation of this control would be similar to copy X). If a copy is requested the voucher retained on the transferring device must be updated as described above, and new usage state information must be created for the re-targeted voucher. The re-targeted voucher would probably be given a usage state of copy no more to avoid the proliferation of copies, but it could also get a copy of the original's now updated usage state. The re-targeted voucher would usually have the same domain traversal flag as the original voucher.

Next in block 360, the content and voucher would be sent to the target device. This is either the re-targeted voucher or a copy of the original voucher if the yes branch of block 320 was followed.

Finally, if it is determined in block 365 that the requested transfer was a move, then, in block 370 the content and voucher are erased, or otherwise made inaccessible or illegible, on the transferring device. Block 375 marks the end of the routine.

Figure 4A:
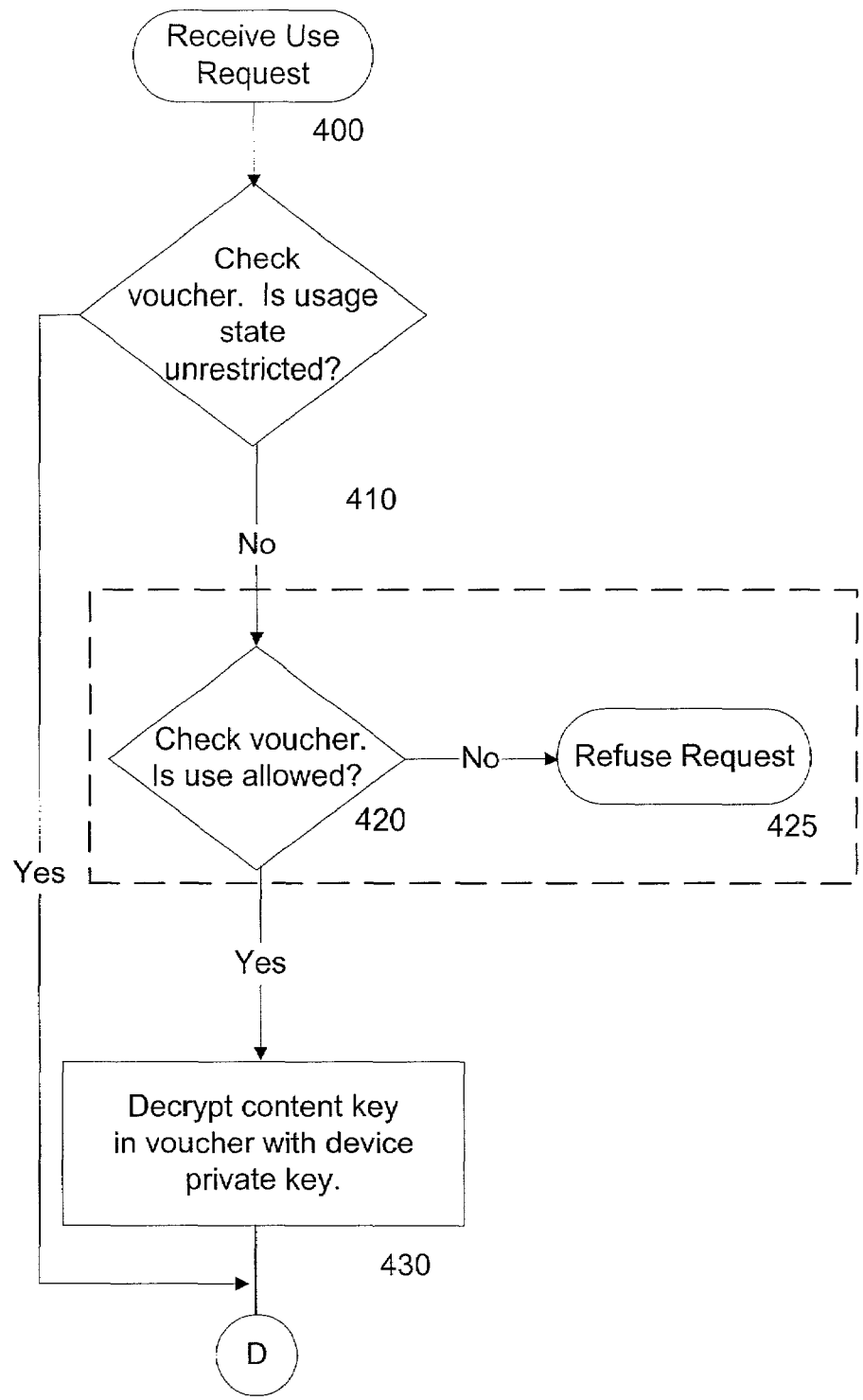
FIGS. 4a and 4b are an exemplary flow chart by which an authorized device uses content in the embodiment of FIG. 1.
Figure 4B:
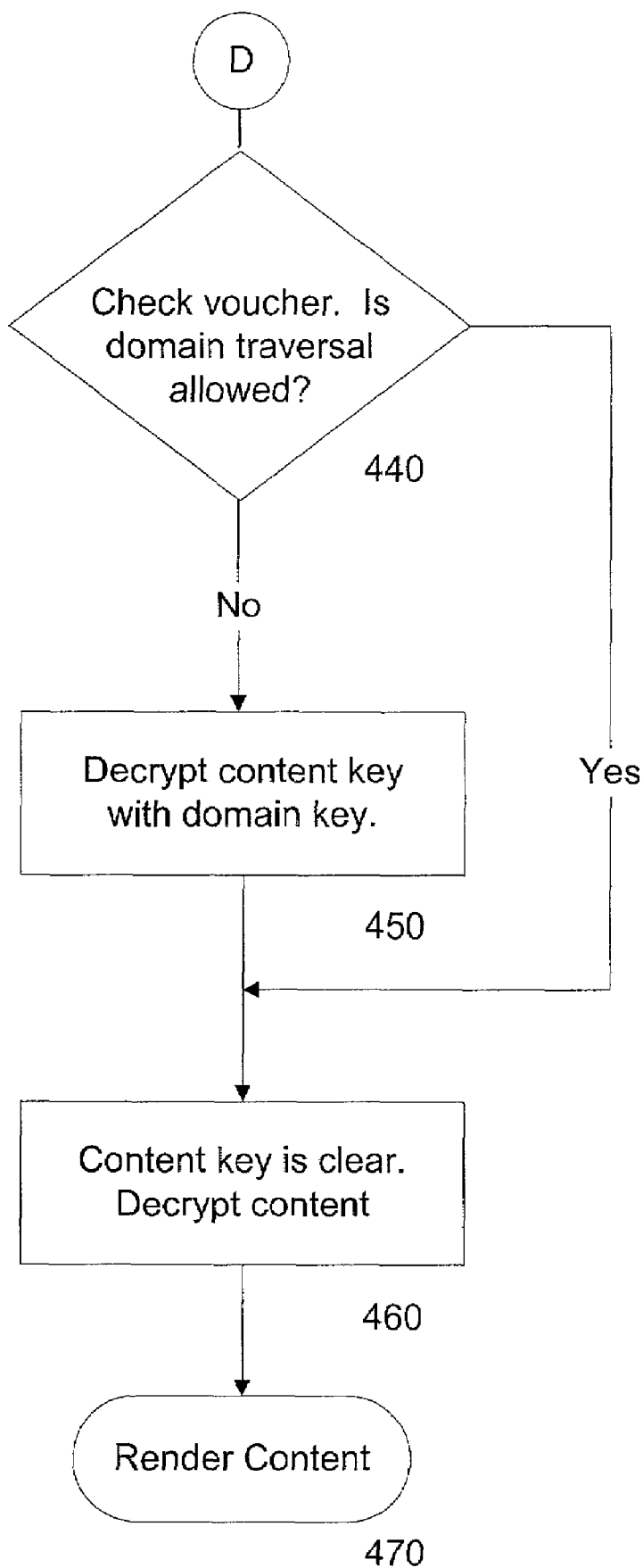

FIGS. 4a and 4b are an exemplary flow chart by which an authorized device uses content in the embodiment of FIG. 1. The process begins in block 400 with a play request. In block 410, the usage state record in the voucher is checked. In blocks 420 and 425, play limits are enforced. This may simply require additional usage states dictating whether or not the content can be played, or how many times the content can be played. Obviously, blocks 420 and 425 are removed if no play restrictions are used. In block 430, the content key in the voucher is decrypted with the device private key. This block, however, is only reached if the usage state is not unrestricted. Otherwise, the content key would not have been encrypted with the device's public key.

In block 440, the domain traversal flag is checked. If domain traversal is forbidden, the content key must be decrypted in block 450 with the domain key. The content key is now clear and the content may be decrypted in block 460. Note, if the content is completely unprotected it would not be encrypted, so the content would not need to be decrypted. Finally, in block 470 the device renders the content.

Figure 5:
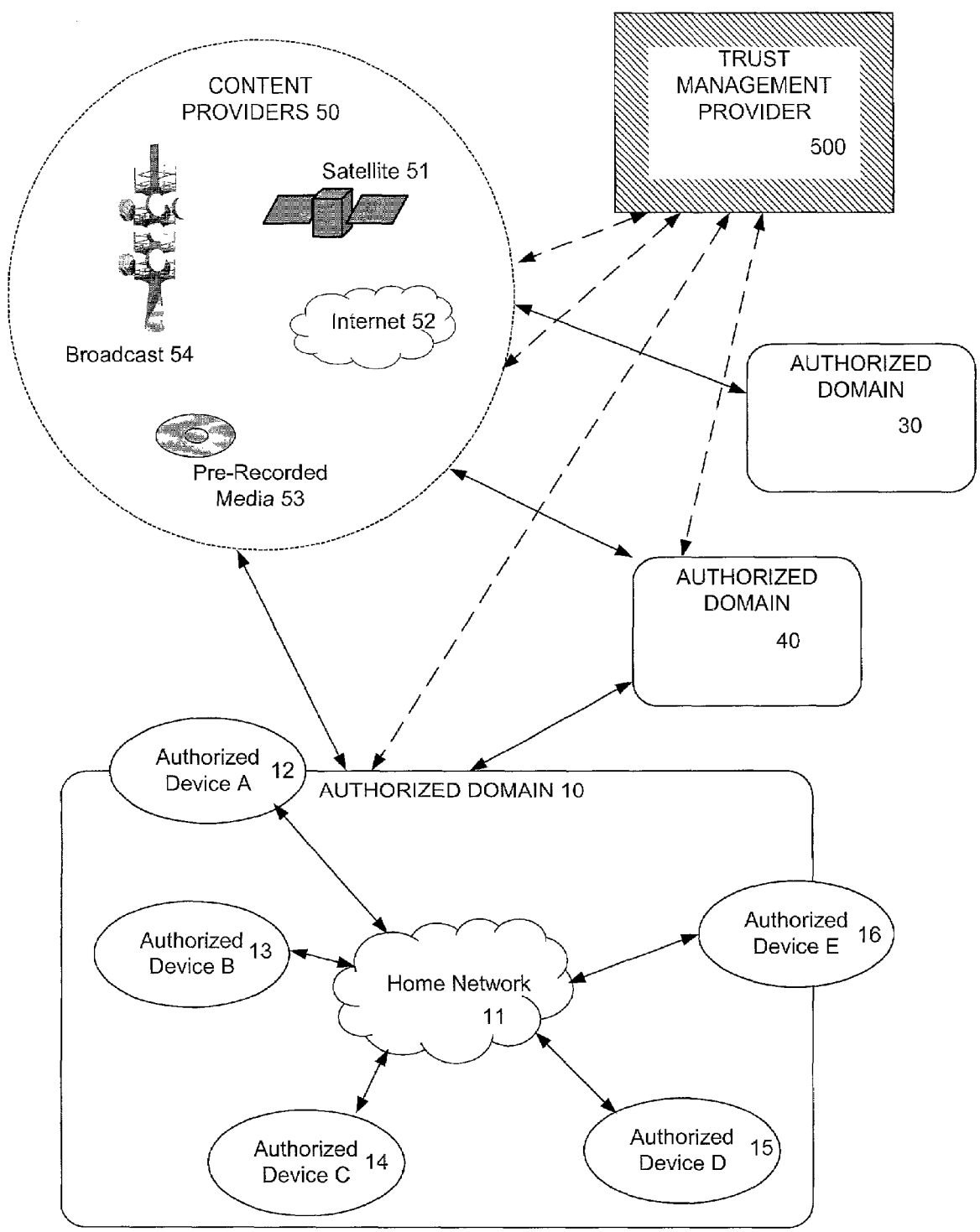
FIG. 5 is a block diagram of an exemplary embodiment of the present invention employing a trust management provider.

FIG. 5 is a block diagram depicting an exemplary embodiment of the present invention, similar to the embodiment of FIG. 1, but also including a trust management provider 500. The trust management provider facilitates some of the more complex transactions that are enabled by the present invention.

The present invention could be used as a comprehensive content protection scheme for any type of content or device. In this advantageous embodiment a multitude of content providers and device manufacturers would all implement the system. However, with a system so widespread the various different implementations of the content protection scheme might not all operate in the same way. In this scenario a trusted third party can be interposed in the form of a trust management provider to ensure the various implementations remain interoperable.

In practice the trust management provider 500 can be implemented through the use of a server that can communicate with the requisite devices and which is programmed to enforce the rules of the system.

Referring to FIG. 5, the various authorized devices 12–16 in authorized domain 10 might all be manufactured by different entities. Accordingly, when a user of the domain adds a new device to the domain the trust management provider 500 can be consulted to certify that the new device meets the standards required by the system. This process could include communicating with a third party that dictates the rules for domain creation for this user; e.g. a content provider. Alternatively, the trust management provider might control the entire process of joining devices into authorized domains and maintaining the created domains. In this role the trust management provider could also replace unusable content keys produced with content key seeds, as described above. The trust management provider might also provide information to the other devices in the domain concerning the operation of the new device.

The trust management provider can also be used to facilitate inter-domain transfers, for example, between authorized domains 10 and 40. Authorized domains 10 and 40 could both contain devices that receive and store DVB content. However, if they receive their content from different providers, e.g. different cable companies, issues may arise from the transfer. The content providers might want assurances that content would be adequately protected in the other domain. The trust management provider could check the requirements of the content provider and then determine if the receiving domain meets them. Or, the content provider may require payment if the content is being transferred to the user of a different service. The trust management provider can also coordinate the payment, see below.

The use of a trust management provider can facilitate business transactions and usage-clearing involving protected content. For example, in a superdistribution model when content is sent from one user's domain to another's many payments may be generated. A concrete example will illustrate some possible payments and the utility of the trust management provider. User A downloads some music from a content provider over the Internet and pays for the use of the content. He then transfers a copy of the content to a friend User B in a different authorized domain. User B receives the content listens to sample and decides to purchase usage rights of his own. The trust management provider can ensure the following parties receive part of the payment: User A might get a portion for sending the content to User B, the content provider will get a portion, and the content creator will get a portion. The use of a trust management provider as a trusted neutral third party ensures that all such transactions are properly accounted for.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact instruction and operation illustrated and described herein. Accordingly, all suitable modifications and equivalents that may be resorted to are intended to fall within the scope of the claims.

The invention claimed is:

1. A method of moving protected content within an authorized domain comprising:
   transmitting encrypted content and a voucher associated with said encrypted content from a first device in the authorized domain to a second device in the authorized domain;
   the voucher including an encrypted content key and a usage state record, wherein the usage stage record enforces play limits;
   at the first device rendering any vouchers associated with said encrypted content unusable,
   wherein all devices in the authorized domain have ability to decrypt the encrypted content key, and
   wherein said all devices are devices of one or more of a user and a family.

2. The method of claim 1 further comprising:
   encrypting the entire voucher.

3. The method of claim 1 further comprising:
   receiving said encrypted content and the voucher associated with that content in a second device in the authorized domain.

4. The method of claim 3 comprising:
   decrypting the encrypted content key at the second device; and
   using the decrypted content key to decrypt the encrypted content.

5. A method for moving protected content from a first device in a first authorized domain to a target device in a second authorized domain comprising:
   checking a voucher associated with a piece of content;
   the voucher including an encrypted content key, a usage state record and a domain traversal flag, wherein the usage state record enforces play limits;
   if the usage state record allows moving,
      decrypting the encrypted content key with a device key; and
      encrypting the decrypted content key with the public key of the target device;
      replacing the original encrypted content key with the re-encrypted content key in the voucher;
      transmitting encrypted content and the amended voucher to the target device; and
      at the first device rendering any vouchers associated with the content unusable,
   wherein all devices in the first authorized domain have ability to decrypt the encrypted content key, and
   wherein said all devices in the first authorized domain are devices of one or more of a user and a family.

6. The method of claim 5 where the device key used to decrypt the encrypted content key is a private key of the first device.

7. The method of claim 5 further comprising:
   decrypting the voucher received at the target device using a private key associated with the target device's public key;
   decrypting the encrypted content using the decrypted content key from the voucher.

8. An article of manufacture comprising:
   a computer readable medium comprising instructions for:
      transmitting encrypted content and a voucher associated with said encrypted content from a first device in an authorized domain to a second device in the authorized domain;
      the voucher including an encrypted content key and a usage state record, wherein the usage stage record enforces play limits;
      at the first device rendering any vouchers associated with said encrypted content unusable,
      wherein all devices in the authorized domain have ability to decrypt the encrypted content key, and
      wherein said all devices are devices of one or more of a user and a family.

9. The computer readable medium of claim 8 further comprising instructions for:
   encrypting the entire voucher.

10. An article of manufacture comprising:
    a computer readable medium comprising instructions for:
       on a first device checking a voucher associated with a piece of content;
       the voucher including an encrypted content key, a usage state record and a domain traversal flag, wherein the usage state record enforces play limits;
       if the usage state record allows moving,
          decrypting the encrypted content key with a device key; and
          encrypting the decrypted content key with the public key of a target device;
          replacing the original encrypted content key with the re-encrypted content key in the voucher;
          transmitting encrypted content and the amended voucher to the target device; and
          rendering any remaining vouchers associated with the content unusable,
       wherein all devices in an authorized domain have ability to decrypt the encrypted content key, and
       wherein said all devices are devices of one or more of a user and a family.

11. The article of manufacture of claim 10 where the device key used to decrypt the encrypted content key is a private key of the first device.

12. An apparatus capable of moving protected content within an authorized domain comprising:
    means for transmitting encrypted content and a voucher associated with said encrypted content from said apparatus to a second device in the authorized domain;
    the voucher including an encrypted content key and a usage state record, wherein the usage stage record enforces play limits;
    means for rendering any vouchers associated with said encrypted content unusable,
    wherein all devices in the authorized domain have ability to decrypt the encrypted content key, and
    wherein said all devices are devices of one or more of a user and a family.

13. The apparatus of claim 12 further comprising:
    means for encrypting the entire voucher.

14. An apparatus in a first authorized domain capable of moving protected content to a target device in a second authorized domain comprising:
    means for checking a voucher associated with a piece of content;
    the voucher including an encrypted content key, a usage state record and a domain traversal flag, wherein the usage state record enforces play limits;
    means for decrypting the encrypted content key with a device key;
    means for encrypting the decrypted content key with the public key of the target device;
    means for replacing the original encrypted content key with the re-encrypted content key;

means for transmitting encrypted content and the amended voucher to the target device; and means for rendering any vouchers associated with the content unusable, wherein all devices in the first authorized domain have ability to decrypt the encrypted content key, and wherein said all devices in the first authorized domain are devices of one or more of a user and a family.

15. The apparatus claim 14 where the device key used to decrypt the encrypted content key is a private key of the apparatus.

* * * * *